United States Patent
Valdez

(10) Patent No.: US 12,314,409 B2
(45) Date of Patent: *May 27, 2025

(54) REMOTE OWNERSHIP AND CONTENT CONTROL OF MEDIA FILES ON UNTRUSTED SYSTEMS

(71) Applicant: Superfile, Inc., Beverly Hills, CA (US)

(72) Inventor: Shane Ryan Valdez, Beverly Hills, CA (US)

(73) Assignee: Superfile, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,828

(22) Filed: Aug. 16, 2024

(65) Prior Publication Data

US 2024/0403449 A1 Dec. 5, 2024

Related U.S. Application Data

(63) Continuation of application No. 18/636,001, filed on Apr. 15, 2024, which is a continuation of application
(Continued)

(51) Int. Cl.
*G06F 21/60* (2013.01)
*G06F 16/182* (2019.01)
(Continued)

(52) U.S. Cl.
CPC .......... *G06F 21/602* (2013.01); *G06F 16/183* (2019.01); *H04L 9/0894* (2013.01); *H04L 9/3239* (2013.01); *H04L 9/50* (2022.05)

(58) Field of Classification Search
CPC .. G06F 21/602; G06F 16/183; G06F 21/6218; G06F 21/64; H04L 9/0894; H04L 9/3239; H04L 9/50; H04L 2209/60
See application file for complete search history.

(56) References Cited

U.S. PATENT DOCUMENTS 10,412,434 B1 * 9/2019 Matthews .......... H04N 21/4394
11,977,644 B2 5/2024 Valdez
(Continued)

FOREIGN PATENT DOCUMENTS

| CN | 110266660 A | * | 9/2019 |
| JP | 2008217300 A | * | 9/2008 |
| WO | WO-2017120939 A1 | * | 7/2017 |

OTHER PUBLICATIONS

U.S. Appl. No. 17/383,558, "Non-Final Office Action", Jan. 19, 2024, 14 pages.
(Continued)

*Primary Examiner* — Mohammed Waliullah
(74) *Attorney, Agent, or Firm* — Kilpatrick Townsend & Stockton LLP

(57) ABSTRACT

One example method includes receiving, by a client computing device, a request to open a superfile stored in a memory device at the client computing device, the superfile comprising encrypted content, the request comprising user credential information; in response to receiving the request to open the superfile, communicating, by the client computing device, a request to a remote server to access the superfile, the request including a credential associated with the user account; receiving, from the remote server, cryptographic information; decrypting, using the cryptographic information, the encrypted content; accessing and presenting the decrypted content; and maintaining communications with the remote server while the decrypted content is accessed.

17 Claims, 9 Drawing Sheets

Related U.S. Application Data

No. 17/383,558, filed on Jul. 23, 2021, now Pat. No. 11,977,644.

(60) Provisional application No. 63/056,288, filed on Jul. 24, 2020.

(51) Int. Cl.
*H04L 9/00* (2022.01)
*H04L 9/08* (2006.01)
*H04L 9/32* (2006.01)

(56) References Cited

U.S. PATENT DOCUMENTS

| | | | |
|---|---|---|---|
| 2006/0085862 A1* | 4/2006 | Witt | H04N 21/26613 726/28 |
| 2007/0033637 A1* | 2/2007 | Yami | H04L 9/3234 726/2 |
| 2007/0136607 A1 | 6/2007 | Launchbury et al. | |
| 2008/0288629 A1* | 11/2008 | Fisher, III | G06Q 30/02 709/224 |
| 2014/0059677 A1* | 2/2014 | Urness | G16Z 99/00 718/1 |
| 2014/0156991 A1* | 6/2014 | Baskaran | H04L 63/205 713/165 |
| 2014/0173016 A1 | 6/2014 | Saarinen et al. | |
| 2016/0028552 A1 | 1/2016 | Spanos et al. | |
| 2016/0321654 A1 | 11/2016 | Lesavich et al. | |
| 2017/0116693 A1 | 4/2017 | Rae et al. | |
| 2017/0163841 A1* | 6/2017 | Taima | G06K 15/1823 |
| 2017/0264428 A1* | 9/2017 | Seger, II | H04L 9/3239 |
| 2018/0068091 A1 | 3/2018 | Gaidar et al. | |
| 2018/0115416 A1 | 4/2018 | Diehl | |
| 2018/0309739 A1* | 10/2018 | Kumhyr | G06F 21/6218 |
| 2018/0322259 A1 | 11/2018 | Solow et al. | |
| 2019/0361694 A1* | 11/2019 | Gordon | G06F 9/452 |
| 2022/0004655 A1* | 1/2022 | Zhang | G06F 21/107 |

OTHER PUBLICATIONS

U.S. Appl. No. 17/383,558 , "Notice of Allowance", Mar. 22, 2024, 9 pages.

U.S. Appl. No. 18/635,801 , "Non-Final Office Action", Jun. 10, 2024, 13 pages.

EP21846724.9 , "Extended European Search Report", Jun. 18, 2024, 11 pages.

Hwang , et al., "Blockchain-Based Resource Syndicate", Institute of Electrical and Electronics Engineers Computer Society, vol. 52, No. 5, May 14, 2019, pp. 58-66.

PCT/US2021/042881 , "International Preliminary Report on Patentability", Feb. 2, 2023, 7 pages.

PCT/US2021/042881 , "International Search Report and Written Opinion", Oct. 22, 2021, 8 pages.

Wang , et al., "A Secure Cloud Storage Framework with Access Control Based on Blockchain", Institute of Electrical and Electronics Engineers Access, vol. 7, Jul. 23, 2019, pp. 112713-112725.

U.S. Appl. No. 18/635,801 , "Notice of Allowance", Sep. 24, 2024, 8 pages.

U.S. Appl. No. 18/636,001 , "Non-Final Office Action", Oct. 28, 2024, 11 pages.

* cited by examiner

REMOTE OWNERSHIP AND CONTENT CONTROL OF MEDIA FILES ON UNTRUSTED SYSTEMS

CROSS-REFERENCE TO RELATED APPLICATIONS

This application is a continuation of U.S. patent application Ser. No. 18/636,001, filed Apr. 15, 2024, titled "Remote Ownership and Content Control of Media Files on Untrusted Systems," which is a continuation of U.S. patent application Ser. No. 17/383,558, filed Jul. 23, 2021, titled "Systems and Methods for Remote Ownership and Content Control of Media Files on Untrusted Systems," which claims priority to U.S. Provisional Patent Application No. 63/056,288, filed Jul. 24, 2020, titled "New computer file type that is trackable, has analytics. has the ability to change access at any time, is able for the owner of the file update it and then it updates everyone file who has the file.," the entirety of which is hereby incorporated by reference.

FIELD

The present application generally relates to remotely controlling access to media content and more particularly relates to systems and methods for remote ownership and content control of media files on untrusted systems.

BACKGROUND

Computing systems can store data in different ways. One common way to store data is in a file on a non-volatile memory device, such as a hard drive. Data in such files may be accessed by different applications executed by the computing system and the files may be copied to other storage devices.

SUMMARY

Various examples are described for systems and methods for remote ownership and content control of media files on untrusted systems. One example method includes receiving, by a client computing device, a request to open a superfile stored in a memory device at the client computing device, the superfile comprising encrypted content, the request comprising user credential information; in response to receiving the request to open the superfile, communicating, by the client computing device, a request to a remote server to access the superfile, the request including a credential associated with the user account; receiving, from the remote server, cryptographic information; decrypting, using the cryptographic information, the encrypted content; accessing and presenting the decrypted content; and maintaining communications with the remote server while the decrypted content is accessed.

Another example method includes receiving, from a remote client device, a request to access encrypted content within a superfile, the request comprising user credential information, the superfile stored in a memory device of the remote client device and comprising encrypted content; determining a level of authorization to access the encrypted content; in response to determining the level of authorization: providing cryptographic information to the remote client device; and while the superfile is open at the remote client device, receiving and storing usage information from the remote client device associated with the encrypted content.

Another example method includes receiving, from a remote client device, an indication of a creation of a new superfile; creating one or more records in a data store associated with the new superfile; storing one or more cryptographic keys in the one or more records, one of the one or more keys used to encrypt content in the superfile; and receiving and storing a copy of the superfile.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
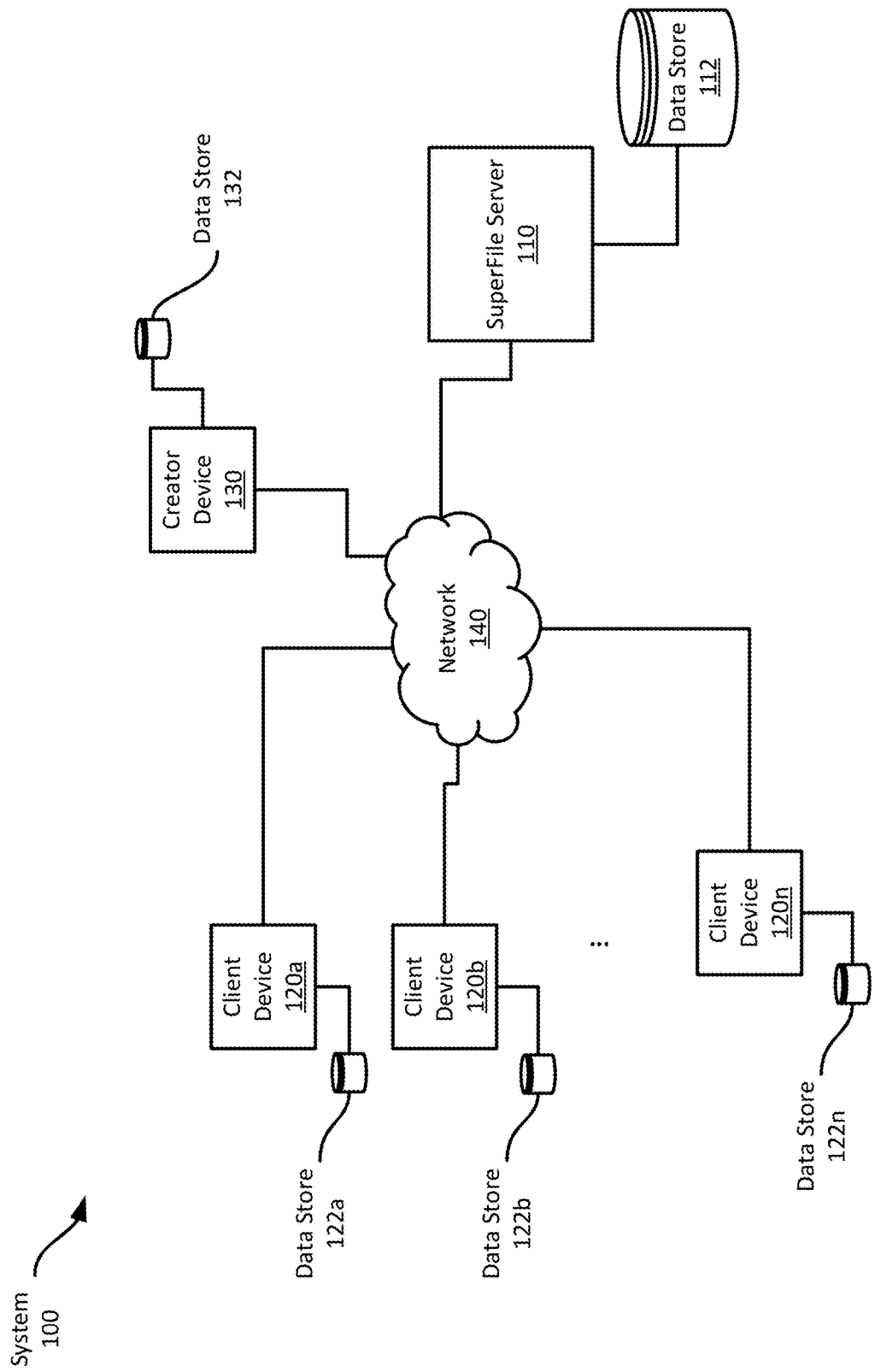
FIG. 1 shows an example system for remote ownership and content control of media files on untrusted systems.

Examples are described herein in the context of systems and methods for remote ownership and content control of media files on untrusted systems. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Computers are ubiquitous in modern society and are commonly used to create, exchange, view, and edit photos, videos, documents, and other kinds of files. However, computer files mostly lack functionality to allow owners of content contained within the file to exert control over that content. While some applications allow users to password-protect files or to lock files from being edited, such functionality is applied to a file and, once the file has been distributed to others, the owner subsequently lacks the ability to change those restrictions, except by providing the necessary password or to provide an alternate copy of a file that is not locked to editing.

Alternatively, computer files may be stored and shared via an online platform, such as a cloud service, that allows different users to access the files on the platform, such as to view or edit them. However, control over these files is provided by the platform itself and is not native to the files stored on the platform. Thus, sharing of the files is limited to sharing a reference to where the file is stored and interacting with the platform, which retains control over the file. While this configuration can provide certain advantages, it requires all users to access the same copy of the file, with access mediated by the platform.

To enable content creators to widely distribute their content as discrete files, which may be copied or shared like a conventional file, a user may save content into a file structure referred to as a "superfile." The superfile includes both the content the file's author has created—video, audio, text, spreadsheets, etc.—as well as information to cause the computing device or client device to communicate with a remote server to obtain access to the superfile's content or provide information about the use of the file contents and any restrictions imposed on the user.

An example superfile includes a header portion and a content portion, where the content is encrypted, but the header is not. The content portion includes whatever content the file's creator or editor has generated. In contrast, the header portion includes information that enables a user's client device to request cryptographic information to decrypt and access the superfile's contents.

When a user attempts to open the superfile, the operating system detects the file type as a superfile, e.g., by detecting a file extension of .super (e.g., movie.super), and accesses the header portion of the superfile. From the header, the operating system extracts information identifying a server computer (or computers), which may be encoded as a universal resource identifier ("URI"), such as a universal resource locator ("URL"), and an identifier of the superfile, such as a file ID and cryptographic hash value. It then contacts the server using the URL and provides the file ID and hash value, as well as user credential information.

The server receives the file ID and hash value and confirms that the two match corresponding information about the file. In this example, the server adds blockchains to a blockchain network when new superfiles are created or modified, and thus it can access the blockchain corresponding to the file ID and confirm whether the hash value received from the client computer matches the hash value stored in the blockchain. If the two match, the server confirms that the blockchain corresponds to the identified superfile, and that the superfile is authentic.

After identifying the corresponding record in the blockchain for the superfile, the server determines whether the supplied user credentials are accepted. For example, the user may have a user account with the superfile server. Thus, the user credentials may be the user's username and password, or it may be some other verifiable information to establish the user's identity, such as a cryptographic signature. The server can then confirm the user's identity and access either the blockchain record to determine whether the user has access to the file or a separate data store that includes such information.

After receiving the decryption key, the client device decrypts the contents of the file in memory and presents it to the user, while maintaining a connection to the superfile server and also deleting the decryption key. While the client device has the superfile open, it may send information to the superfile server, such as which portions of the content are being viewed, how long the file is open, how much idle time is detected, whether the user attempts to copy or edit the content, etc. The superfile server may store the received information in a data store record corresponding to the blockchain record of the superfile. At a later time when the user closes the superfile, the user's computer deletes the decryption key and stops presenting the contents of the superfile.

While this example provides a simple example of a user accessing a superfile, one advantage of a superfile is that the owner of the superfile may edit its contents or change access levels to the superfile, which then may be propagated in real-time to any copies of the superfile that are then open on a user's computer. For example, if the owner of a superfile edits text in a superfile document, those edits are sent to the superfile server, which then provides them to each copy of the file that is open at other client computers at that time. Thus, those other client computers receive the edited contents and both update the contents of the superfile itself but also dynamically change the displayed decrypted content that may be viewed by the user. Thus, the user will see the updates in near-real-time as they are made by the owner of the file. When one of the viewing users closes the superfile, the changes received to that point will be stored in their copy of the superfile. For any users that were not viewing the superfile, but later access it, they will immediately be provided with the updated contents, such as upon being approved to access the superfile. Thus, the superfile provides a way to enable users to use superfiles as any traditional file, but receive (or provide) updates in near-real-time.

Similarly, the owner of the superfile may change access restrictions on the superfile contents, which then may be propagated in near-real-time to any other copy of the file that is then-currently open. For example, if the owner revokes a user's access while the user has the superfile open, the superfile server transmits a message to the client's computer, which immediately stops providing the decrypted contents to the user by overwriting the memory containing the decrypted contents so that the contents are no longer accessible by the user. It may also provide a notification that the user's access rights have been revoked by the owner.

Using superfiles, content creators may allow their works to be freely copied by anyone, while still retaining control over access to their works. In addition, usage information collected by a superfile server may allow the user to monitor the engagement with their content, which may enable them to directly monetize it, e.g., by selling access to the content, or to indirectly monetize it, such as by selling advertisements to go along with the content. Furthers, by employing blockchains as a mechanism to record information about superfiles, the authenticity and chain of ownership for a superfile can be confirmed by accessing the blockchain.

This illustrative example is given to introduce the reader to the general subject matter discussed herein and the disclosure is not limited to this example. The following sections describe various additional non-limiting examples and examples of systems and methods for remote ownership and content control of media files on untrusted systems.

Referring now to FIG. 1, FIG. 1 shows an example system for remote ownership and content control of media files on untrusted systems. The example system includes a creator device 130 and a number of client devices 120*a-n* that are able to communicate with a superfile server 110 via one or more communications networks 130. Each of these computing devices 110, 120*a-n*, 130 includes a corresponding data store 112, 122a-n, 132 where the respective computing device can permanently store and access one or more data files.

Each of the users of the client devices 120a-n or creator device 130 are able to use the respective device to do any number of different things, such as creating or viewing creative content. Such content is typically created using one or more software applications and then stored in one or more data files (or just "files") on the user's client device 120a-n. The user (or "creator") may then share that content with other users, whether known to the creator or not, by providing a copy of the relevant file(s). The recipient then has access to the file(s) and may view the content and, in some cases, edit the content. However, once a recipient receives a copy of a file, they have a self-contained electronic package that includes the entirety of the content, which they may then access and use however they wish.

In the example system 100 shown, each of the client devices 120a-n is operated by one or more users and are generally referred to as "untrusted" clients with respect to the creator device 130. "Untrusted" in this sense means a device that is operated by a user independent and autonomous of the creator's control. Thus, the creator has no way to access the user's client device 120a-n, such as to prevent actions taken with respect to content another user may wish to take. In addition, without the use of such an example system 100, the creator would lack the ability to establish they were the creator of the content or to track the use of their own data files by other users.

To enable the creator to maintain control over their own content, they can save their content as a part of a superfile. A superfile is a type of file that includes functionality to require permission from a superfile server to access the contents of the file. But more than just permission to initially open a file to access its contents, a superfile requires on-going communication with the superfile server to both ensure the permission to access the file contents is not changed or revoked and to track a user's use of the contents of the file.

When a user receives a superfile, they receive the entirety of the superfile, which appears to be an ordinary file. Thus, the receiving user (or "recipient") is in possession of the entire file and its contents, rather than some portion of the file residing at a remote computer. In some examples, a superfile may be identified as such by a filename extension (e.g., .super), though in some examples, a superfile may not have a file extension or a specific file extension.

To access the file, the user may attempt to open the file using their client device, e.g., client device 120a, as they would any other file, e.g., by selecting and double-clicking on a file icon for the superfile using a mouse. An operating system ("OS") executed by the recipient's client device may detect the command to open the file based on user input and determine that the file is a superfile, e.g., based on a file extension or by accessing header information within the superfile (discussed in more detail below). Upon determining the file is a superfile, the OS may first attempt to natively open the file or it may launch an application installed on the recipient's client device to open the file. For example, the content header may indicate the type of content stored in the superfile and the client device may open an application corresponding to that type of content.

To open the file, the OS or application (both referred to as the "application") attempts to contact a superfile server, e.g., superfile server 110. To do, the application may issue a DNS request to obtain a network address for a pre-configured server name, e.g., files.superfile.org. The DNS response provides the network address, e.g., an internet protocol ("IP") address, which the application then uses to contact the superfile server 110. The application may also attempt to authenticate the identified server, e.g., via a trusted certificate authority, before or while establishing communications with the server 110.

After establishing communications with the superfile server 110, the application requests access to the contents. The superfile server 110 may determine whether the application or the corresponding user has permission to access the contents and, if so, may transmit information needed to decrypt or decompress the contents of the super file. After receiving the information, the application uses the information to decrypt or decompress the content, and the application may then itself present the content or it may execute a separate application to present the content. In this example system, when content is decrypted, it is only decrypted into volatile system memory to enable presentation to the user. A decrypted copy of the superfile is not created. This may help ensure the security of the superfile contents in the event access is changed or revoked.

While the content is presented to the user, generally referred to as while the superfile remains "open," the application maintains communications with the superfile server and sends usage information to the server, such as how long the user has had the file open, which portions of the content are being viewed or presented, etc. The superfile server 110 may store such information in its data store 112 and associate it with a record corresponding to the superfile.

If the application loses contact with the superfile server 110 while the superfile is open, the application may immediately terminate access to the superfile, such as by deleting the information needed to decrypt or decompress the content (if not already deleted), deleting or overwriting any information from the superfile contents that had been copied into memory to enable presentation of the contents, closing any separate application used to view the contents, etc. In some examples the application may instead wait a predetermined period of time before terminating access, e.g., five or ten minutes, to alleviate issues related to intermittent network failures. If communications with the superfile server are resumed, access may be restored, if it had been terminated, or the predetermined period may be reset.

When a user attempts to access a superfile, they may be granted access according to permissions established by the creator of the content within the superfile. For example, the creator may have "owner" access to the file, which may allow the creator to freely edit or delete the content, change permissions for different users, or transfer ownership of the content to another user. Other users may have "viewer" access, which may allow them to view the contents, but not edit them. Some users may have "editor" access, which may allow them to edit the content but not perform ownership functionality, such as enabling other users to view the content. Still other types of permissions may be established.

The different permission levels for each file may be maintained by one or more superfile servers, e.g., superfile server 110. Thus, when a user attempts to access a superfile, the superfile server 110 may determine whether the user has permission to access the contents of the superfile and, if so, to what degree, e.g., owner, editor, viewer, etc. The permission levels may affect the user's ability to make or save changes to the content within the superfile. For example, a user may open a document saved as a superfile, where they only have "viewer" permission to the contents. To prevent the user from editing the file, an application, such as the OS or an editing application (e.g., a word processing application), may open the file as "read-only" to prevent the user from editing the contents of the superfile.

Because superfiles may be distributed freely, any number of copies of a particular superfile may be in circulation and may be opened concurrently. Thus, a user at one client device, e.g., client device 120a, may open a copy of a superfile while a user at another client device 120b, also has a copy of the superfile open. Both client devices 120a,b will communicate with the superfile server 110, generally as discussed above.

As a result of the client devices 120a,b maintaining communications with the superfile server 110, any updates made to the superfile's contents, e.g., by the owner or an "editor," may be immediately propagated to any client devices 120a,b that have a copy of the superfile open by the superfile server. Any client devices that do not have a copy of the superfile open will instead receive the updated contents the next time the superfile is opened. Similarly, if user permissions are changed, the updated permissions will be propagated immediately to any affected users with the superfile open. For example, if a user has "editor" permission, which is changed to "viewer" permission while they have the file open, their client device will receive the changed permission from the superfile server 110 and prevent any changes from being saved to the superfile. In some cases, changes by the editor made while the superfile was open before the permission change will be rolled back, though in some cases, the prohibition on edits will be prospective only. Further, if a user has their permission to access the file revoked, the superfile contents will immediately be rendered inaccessible, e.g., by closing the superfile and discarding any cryptographic information used to access the contents. In some examples, the superfile may remain open, but the contents will no longer be presented and instead an indication that permissions have been changed will be displayed.

It should be appreciated that because the client devices 120a-n are not under the control of the superfile server 110, the superfile server 110 itself cannot ensure a user has not tampered with one or more applications executed by the client device to enable functionality that would otherwise be prohibited. However, even if a user were to surreptitiously modify the contents of the superfile, the modification would be detectable by the superfile server 110 or another client device 120a-n that has not been tampered with. As discussed above, a user with "editor" permission may be able to modify the contents of the superfile, which are then propagated to the superfile server 110 and then to other users that have copies of the superfile. However, if a user tampers with the superfile to modify its contents, the superfile server 110 will reject the modifications based on the permissions maintained by the superfile server 110. Thus, the user may modify with their own copy of the superfile, but it will not extend to others via the superfile server 110. Alternatively, the user may tamper with the contents of the superfile and attempt to distribute the file to another user (the "recipient" in this example), e.g., via email.

When the recipient attempts to access a superfile that has been tampered with, their client device will contact the superfile server 110 as discussed above and may be presented with a message indicating that the contents of the file differ from the current known state of the superfile. In some examples, the superfile server 110 may instead detect the difference in file contents between the user's copy of the superfile and the current known state of the superfile, and then send the correct file contents to the user to replace the contents in the user's copy. Still other example actions may be taken, such as presenting an error to the user indicating the file contents have been tampered with.

The functionality enabled by the example system 100 is based in part on the structure of a superfile (described below), the use of a superfile server 110, and, in some examples, a blockchain network.

Figure 2:
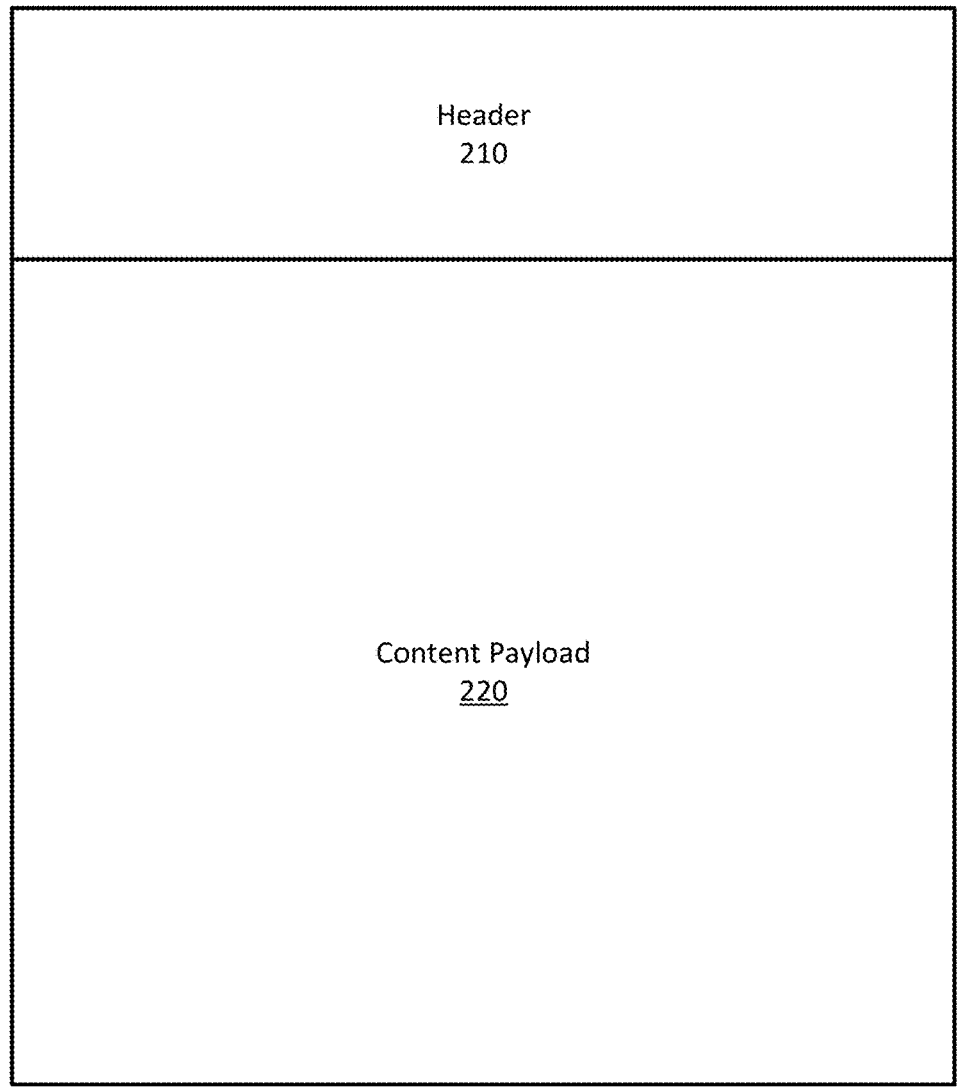
FIG. 2 shows an example structure of a superfile.

Referring to FIG. 2, FIG. 2 shows an example file structure for a superfile 200. The superfile 200 in this example includes a header 210 and a content payload 220. The content payload 220 includes content of any kind created by a creator. Examples of suitable content include written works (e.g., articles, books, scripts, etc.), audio or visual works (e.g., music, video, images, etc.), technical information (e.g., 3D printer plans, computer-assisted design or manufacturing files, etc.), etc. In some cases, the content payload 220 may include another superfile.

To protect the contents of the superfile from unauthorized access, in some examples, the content payload 220 may be encrypted or compressed or both. Any suitable encryption technique may be used according to different examples, such as symmetric key encryption like the Advanced Encryption Standard (AES) family of encryption techniques, e.g., AES-256, or asymmetric key encryption. In addition to (or instead of) encryption, compression techniques may be used to reduce the size of the content payload 220, such as LZ compression. For content payloads 220 that do not include confidential information, e.g., for user manuals, resumes, etc., compression may be sufficient, while for other types of information, encryption may be desirable. However, a creator of a superfile may select whether either encryption or compression is used and, if so, the type to be used. In addition, the creator (or another user with sufficient permissions) may change or remove (or re-apply) encryption or compression from a superfile at any time.

The superfile header 210 includes information identifying the file as a superfile, a unique identifier for the superfile, information indicating a type of encryption or compression applied to the content payload 220, a checksum or hash value for the content payload 220, etc. It may also include certain bibliographic information, such as the creator of the superfile, the creation date of the superfile, checksum or hash value for the bibliographic information, a checksum or hash value for the entire superfile 220, etc. In general, the superfile header 210 may include any information about the superfile that may be desirable to maintain with the superfile contents, as well as certain information that may be needed to enable a client device to contact a superfile server and access the content payload 220.

The example superfile 200 is described as including a header portion 210 and a content payload 220; however, it may include other portions as well, such as a trailer. In some examples, a superfile 200 may include multiple content payloads 220, each of which may be separately accessible depending on a user's permission level. For example, a superfile 200 may have two content payloads 220, one of which may be viewable by anyone with a copy of the file, e.g., a trailer for a movie or prologue of a book, while the other may only be accessible after purchasing access, e.g., the entire movie or book. Thus, a superfile may have any suitable structure to store, regulate, and monitor access to content.

Figure 3:
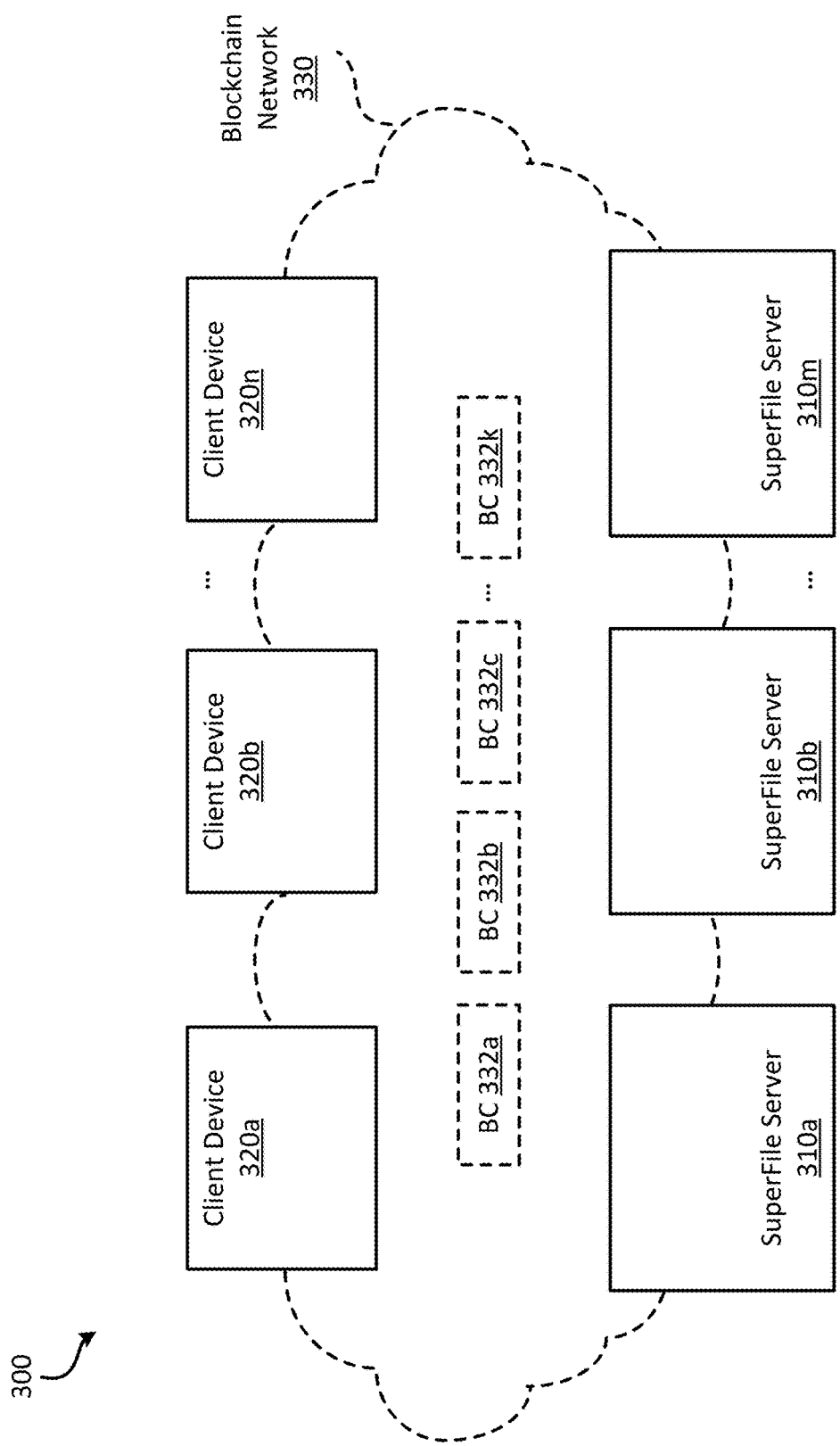
FIG. 3 shows an example system for remote ownership and content control of media files on untrusted systems.

Referring now to FIG. 3, FIG. 3 shows another example system 300 for providing remote ownership and content control of media files on untrusted systems. The example system 300 shown in FIG. 3 includes multiple superfile servers 310a-m and multiple client devices 320a-n collectively implementing a blockchain network 330 that includes blockchains 332*a-k*. The blockchains 332*a-k* provide a permanent, immutable record of superfiles, which the superfile servers 310*a-m* and client devices 320*a-n* can rely on to track and validate superfiles over time and at different computing systems.

In this example, the superfile servers 310*a-m* have the ability to read and write to the blockchains 332*a-k*, while the client devices 320*a-n* are able to read records in the blockchains 332*a-k*. However, in some examples, only superfile servers 310*a-m* may have access to the blockchain network. When new superfiles are created, the creator's client device contacts a superfile server, e.g., superfile server 310*a*, and registers the superfile. The superfile server 310*a* receives a copy of the superfile and establishes a blockchain for the superfile. When other users receive copies of the superfile (or the creator accesses the superfile again), they can verify the integrity of the superfile by accessing the corresponding blockchain and traversing it as necessary. The blockchain also provides ownership information about the superfile, which can include recording information about the creator of the superfile as well as transfers of ownership from user to user. As changes are made to the superfile, a superfile server 310*a-m* adds blocks to the blockchain, which provides an audit trail of changes made to the superfile over time.

In this example system, the superfile servers 310*a-m* are hosted by a trusted third party superfile service provider; however, in some examples, a user (e.g., a creator) or an organization may operate their own superfile server(s) to manage their own suite of superfiles and blockchain networks. For example, a movie studio may manage their own superfile server(s) and blockchain network 310, which may enable the studio to create superfiles to manage access to movies it releases or to release updates or embed different features within movies over time. For example, a movie studio may update movie superfiles to change trailers or marketing promotions associated with various movies. Similarly, other creative organizations, such as advertising agencies, recording studios, research laboratories, etc., may manage their own superfile server(s) and blockchain network to enable users to access their content, while monitoring and maintaining control over the use of that content.

Thus, example systems according to this disclosure may include the use of blockchain networks to ensure the authenticity and validity of superfiles, while the superfile server(s) mediate access to superfile content. However, use of blockchains is an optional feature in some example systems and may be omitted in others.

Figure 4:
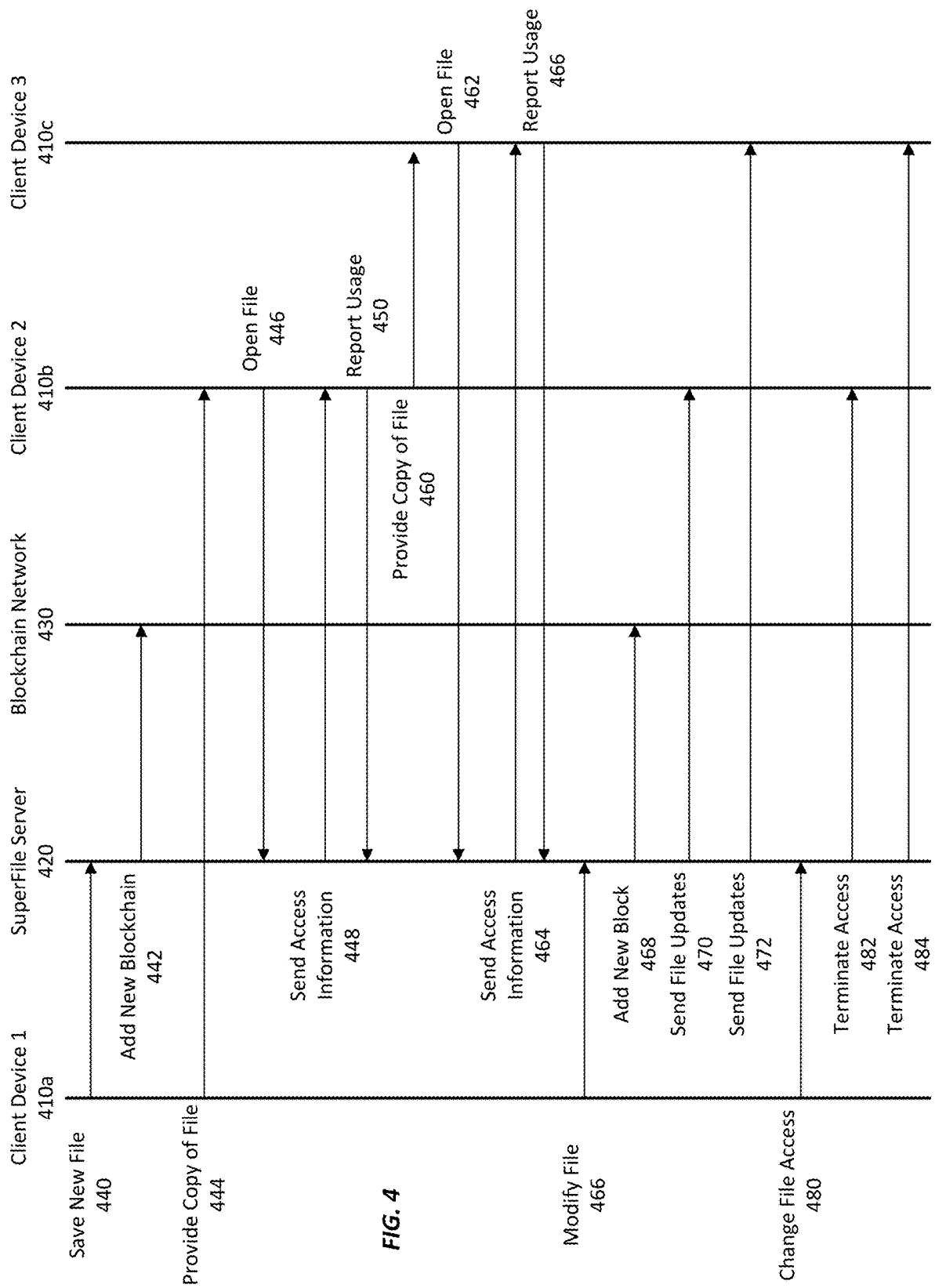
FIG. 4 shows an example sequence diagram for processes relating to remote ownership and content control of media files on untrusted systems.

Referring now to FIG. 4, FIG. 4 shows an example sequence diagram depicting interactions within a system for remote ownership and content control of media files on untrusted systems according to this disclosure. The system includes several client devices 410*a-c*, a superfile server, and a blockchain network 430.

This sequence begins with a user of a client device 410*a* creating content and saving it as a superfile 440. This causes the client device 410*a* to transmit a message to the superfile server 420, indicating the new superfile has been created. In this example, the client device 410*a* also transmits a copy of the superfile to the superfile server 420. The superfile includes both a header portion and content payload, similar to the example superfile discussed above with respect to FIG. 2. The header portion includes a unique identifier for the superfile, which the client device 410*a* previously requested from the superfile server. However, in some examples, the client may create the superfile and save it, and in response, receive a superfile identifier from the superfile server 420. The client device 410*a* may then insert the superfile identifier into the superfile header portion.

In this example, the superfile server 420 takes several different actions in response to receiving the new file 440 message from the client device 410*a*. The superfile server 420 generates a unique superfile identifier, which is provided to the client device 410*a* (not shown), and is inserted into the header of the new superfile by the client device 410*a*. In some examples, the client device 410*a* may generate a unique identifier or request a superfile identifier from the superfile server 420.

The superfile server 420 also creates a new blockchain 442 in the blockchain network 430 corresponding to the new superfile. It includes information about the superfile, such as a superfile identifier, a checksum or hash value (e.g., a cryptographic hash value), a timestamp, a creator name or identifier, an owner name or identifier, etc. In some examples, the blockchain 442 may include a copy of the superfile itself.

In this example, as discussed above with respect to FIG. 3, the blockchain network may be distributed across multiple superfile servers and client devices. Thus, adding a new blockchain to the blockchain network may involve distributing one or more blocks among different computing devices, such as the superfile server 420 or one or more of the client devices 410*a-c*.

After creating the superfile, the creator of the superfile provides a copy of the superfile 444 to another user at a different client device 410*b*. For example, the creator may email the superfile to a recipient or may save it to a portable storage device (e.g., a thumb drive, portable hard drive, etc.), which may then be physically connected to the other client device 410*b*. Because superfiles are self-contained units like a conventional file, and are stored by computing devices as conventional files, they can be easily transferred to other computing devices or storage devices.

The recipient then uses their client device 410*b* to open the superfile 446. To open the superfile, the user may double click on an icon corresponding to the superfile, such as in a graphical user interface ("GUI") provided by the client device's OS. In response to user input to open the superfile, the recipient's client device 410*b* determines that the selected file is a superfile and determines a superfile server to contact to open the file. For example, the application may extract information from the superfile itself to contact a superfile server, e.g., using a URI or IP address stored in the superfile's header. The application may then transmit one or more messages via one or more networks to the superfile server 420 to access the superfile content payload.

The message(s) sent by the client device 410*b* may include user credential information, e.g., identity information for the user or information that may be used to establish the user's identity. The message(s) may also include information about the superfile, such as a superfile identifier, a checksum or hash value, etc., that may be used to identify the superfile that the client device 410*b* is attempting to open. If user credential information is not provided, the superfile server 420 may request it.

In response to receiving the request to open the file 446 from the client device 410*b*, the superfile server 420 determines whether the recipient has permission to access the superfile and, if so, what level of access they are assigned. The superfile server 420 may also perform checks on the superfile itself, such as to determine whether a received checksum or hash value matches the checksum/hash value stored in the corresponding blockchain record for the superfile. In addition, the superfile server 420 may determine whether the superfile content payload has been updated since the recipient received the file from the creator at item 444. For example, the superfile server 420 may search the blockchain corresponding to the superfile to identify a record having a checksum/hash value that matches one received from the client device 410*b*.

If the received checksum/hash value matches the latest version of the superfile in the blockchain, then the superfile server 420 determines that the client device 410*b* has the latest version of the superfile. However, if it matches a blockchain record for an earlier version of the superfile, it may update the superfile at the client device 410*b*, which is described in more detail below with respect to items 470, 472. If the checksum or hash value does not match any block in the blockchain, the superfile server 420 may send an error message or it may update the superfile.

If the superfile server 420 determines that the recipient has permission to access the content payload of the superfile, it can send information needed to access 458 the content payload. Such information can be one or more cryptographic keys, an identification of the compression algorithm used to compress the content payload, etc. In some examples, however, the content payload may not be encrypted or compressed, in which case the superfile server 420 may respond indicating that no decryption or decompression is needed. Further, in some examples, the superfile itself may indicate whether the content payload is encrypted or compressed. If the superfile indicates that it's neither encrypted nor compressed, it may not receive access information at item 448. Instead, the client device 410*b* may establish communications with the superfile server 420 and maintain the communications while the superfile is open. Once the client device 410*b* receives the access information, it can access the content payload. However, in this example, while the client device 410*b* decrypts the superfile contents, it only decrypts the content into volatile, system memory to enable presentation to the user; it does not decrypt the contents to non-volatiles storage. Thus, no separate file with the decrypted client is created. This may help prevent access to the contents without first contacting the superfile server 420.

While the client device 410*b* is accessing the content payload, it may report information about its usage 450 of the superfile to the superfile server 420. Usage information may be reported periodically, e.g., every minute, or in response to events occurring while the superfile is open, e.g., scrolling to a new page, playing/pausing/rewinding/etc. a movie or audio, zooming on a photo, etc. The usage information may include identifications of the actions taken with respect to the content payload (e.g., those described above), how long the content payload has been open, how long the client device 410*b* has been active or idle, when the content payload is in the foreground or background of a GUI presented to the user, when the content was minimized, etc. It may also detect potential unauthorized actions, like attempting to capture a screenshot of presented content, attempted modifications of the content payload, attempted exports of the content payload to a separate file, etc. Such usage information may be reported to the superfile server 420, which may maintain statistics associated with the superfile. Such information may be used to determine a level of engagement with the content, to determine interests of different users, determine advertising or other monetization information related to the content, etc. Such information may be accessible by the creator or owner of the superfile and may be obtained by issuing a request to the superfile server 420 or by accessing an account maintained by the superfile server 420.

At some time, the recipient may further distribute the superfile to other users, such as a user of client device 3 (410*c*) (the "second" recipient). As with respect to item 444, the recipient may distribute the superfile using any suitable mechanism and to any other user. The second recipient may then attempt to open the superfile, which initiates a similar process of sending one or more messages 462 to the superfile server 420 and receiving access information 464, if the second recipient is authorized to access the content payload. The second recipient's client device 410*c* then also maintains communication with the superfile server 420 while the superfile is open and may report usage information 466 to the superfile server 420 as discussed above with respect to item 450.

At some time, the creator or owner or other editor (referred to as the creator in this example) of the superfile may modify the content payload of the superfile. When that occurs, the client device 410*a* reports the modification to the superfile server 420. Modifications may be reported in real-time as the creator modifies the superfile, though in some examples, modifications may only be reported when the user saves the changes to the superfile or closes the superfile. Modifications may be any changes to the superfile, which may be to the content payload, the header portion, or any other aspect of the superfile. Such modifications may include changes of ownership or permission levels, changes to the content payload, etc.

When the modifications are reported 466 to the superfile server 420, the superfile server 420 adds a new block to the blockchain associated with the superfile and stores it in the blockchain network 430. Thus, the blockchain maintains a permanent, immutable record of the superfile as it is revised over time.

In addition to updating the blockchain, the superfile server 420 identifies any other client devices that have the superfile open when the modifications were made. In this example, the superfile server 420 identifies two other client devices 410*b-c* with open copies of the superfile based on the connection maintained with the superfile server 410*b-c*. After identifying the client devices 410*b-c*, the superfile server 420 provides superfile updates to each of the client devices 410*b-c*, where the updates are applied to the superfile and stored. In addition, the presented contents of the superfile (if modified) update in real-time for the users viewing the content. Thus, they can see the file contents change in real-time or near-real-time as the creator revises the file.

At a later time, the creator changes file access permissions 480 for the superfile content payload. These changes are reported to the superfile server 420 similarly to modifications to the file discussed above 466.

In response to receiving the changed file access permissions, the superfile server 420 determines that client devices 410*b-c* now lack permission to access the contents of the superfile and so the superfile server 420 transmits one or more messages 482, 484 to the client devices 410*b-c*, causing them to immediately discontinue presenting the superfile's contents and, if not already discarded, discard any access information that was previously received by the respective client device 410*b-c*, e.g., cryptographic keys. To further secure the content from unauthorized access, the client devices 410*b-c* may also overwrite memory containing the decrypted content to ensure it has been entirely purged from the client's device. Thus, the creator can revoke (or grant) access, in real-time, to anyone with a copy of the superfile.

It should be appreciated that this example sequence only employs a relatively small-scale system with a single superfile server 420 and three client devices 410*a-c* to illustrate certain functionality. However, systems with significantly more components, e.g., tens, hundreds, or thousands or more superfile servers interacting with thousands or millions or more client devices, are envisioned and can provide functionality similar to that discussed above, but on a significantly larger scale.

Figure 5:
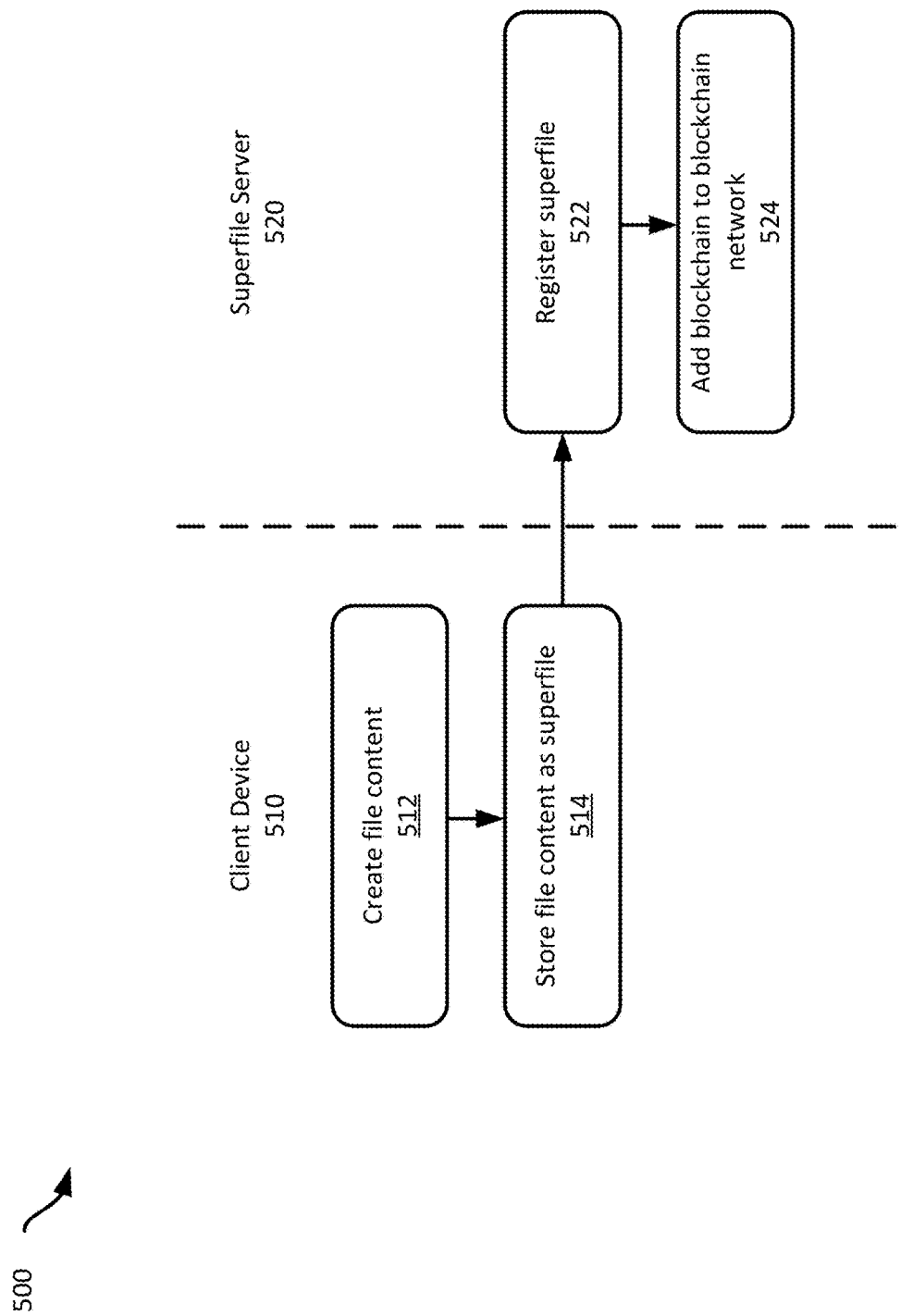
FIGS. 5-8 show example methods for remote ownership and content control of media files on untrusted systems.

Referring now to FIG. 5, FIG. 5 shows an example method 500 for creating a new superfile as a part of a system for remote ownership and content control of media files on untrusted systems. The method 500 in this example involves two different computing systems performing different aspects of the method. And while these aspects may be inter-related, each computing system performs its own distinct method, which may involve receiving inputs from another computing device or sending information to another computing device.

At block 512, a user of a client device 510 creates file content of any suitable type, e.g., documents, audio, video, source code, etc. The user may create the file content using any suitable authoring or capture tool, such as a word processing program, source code editor, video camera, etc. The user may store such content in any suitable file according to any suitable file format.

At block 514, the user elects to store the content as a superfile. This may be done after the content has been stored according to one file format into an existing file, or the user may initially save the content as content within a superfile. To do so, the user may interact with an application and select an option to save or export content (e.g., content stored in volatile memory or content stored in a file stored in a non-volatile memory) to a new superfile. The application may then generate a superfile according to a suitable superfile structure and store the content within a content payload of the superfile. During this process, the application may prompt the user to supply certain information, such as access control information, a selection of one or more encryption options, a selection of one or more compression options, a selection of a superfile server provider, etc. Based on the supplied information, the application may generate or supplement a header portion of the new superfile. The application may then store the contents of the superfile to a non-volatile memory, such as a hard drive or to cloud storage.

While generating the superfile, the client device 510 contacts a superfile server 520, e.g., a superfile server selected by the user or one that is automatically selected by the application, and provides an indication that a new superfile has been created. In addition, the client device 510 provides information about the superfile, including some or all of the header information or some or all of the content payload. In some implementations, the superfile server 520 may generate a unique identifier for the superfile, which is provided to the client device 510, though in some examples, the client device 510 may generate its own unique identifier for the superfile.

In addition to obtaining a unique identifier, if the superfile includes encrypted contents, the client device 514 may generate one or more cryptographic keys to encrypt the contents, or it may request such a key (or keys) from the superfile server 520. The client device 510 then encrypts the contents of the superfile using a cryptographic key.

At block 522, the superfile server 520 registers the superfile by creating a record in a data store corresponding to the superfile. The record may include information about the superfile, such as the superfile identifier, the owner of the superfile, a checksum or hash value for the superfile, etc. It may also include some or all of the content payload of the superfile as well as cryptographic information, e.g., symmetric cryptographic keys, asymmetric cryptographic key pairs, etc., or compression information. In addition to creating the record in the data store, the superfile server 520 may also generate and provide a confirmation to the client device 510 indicating that the superfile was successfully created.

At block 524, the superfile server 520 adds a blockchain to a blockchain network. The new blockchain is associated with the new superfile and a block is created in the blockchain based on the new superfile. The block may include information similar to the information discussed above with respect to block 522. It may also include part or all of the contents of the superfile, such as the header portion or the content payload. By including the content payload, the superfile server 520 may be able to provide the content payload to other computing devices that open the superfile, such as to update a copy of a superfile with the current contents or to fix a corrupted copy of a superfile. Further, any suitable information may be stored in blocks in the blockchain according to different implementations.

Once the superfile has been created and registered with the superfile server 520, the creator may freely distribute the superfile to any other user, who may then be able to access the superfile contents as discussed in more detail below.

It should be appreciated that not all superfile systems may use blockchain techniques. Thus, in some examples, block 524 may be omitted.

Figure 6:
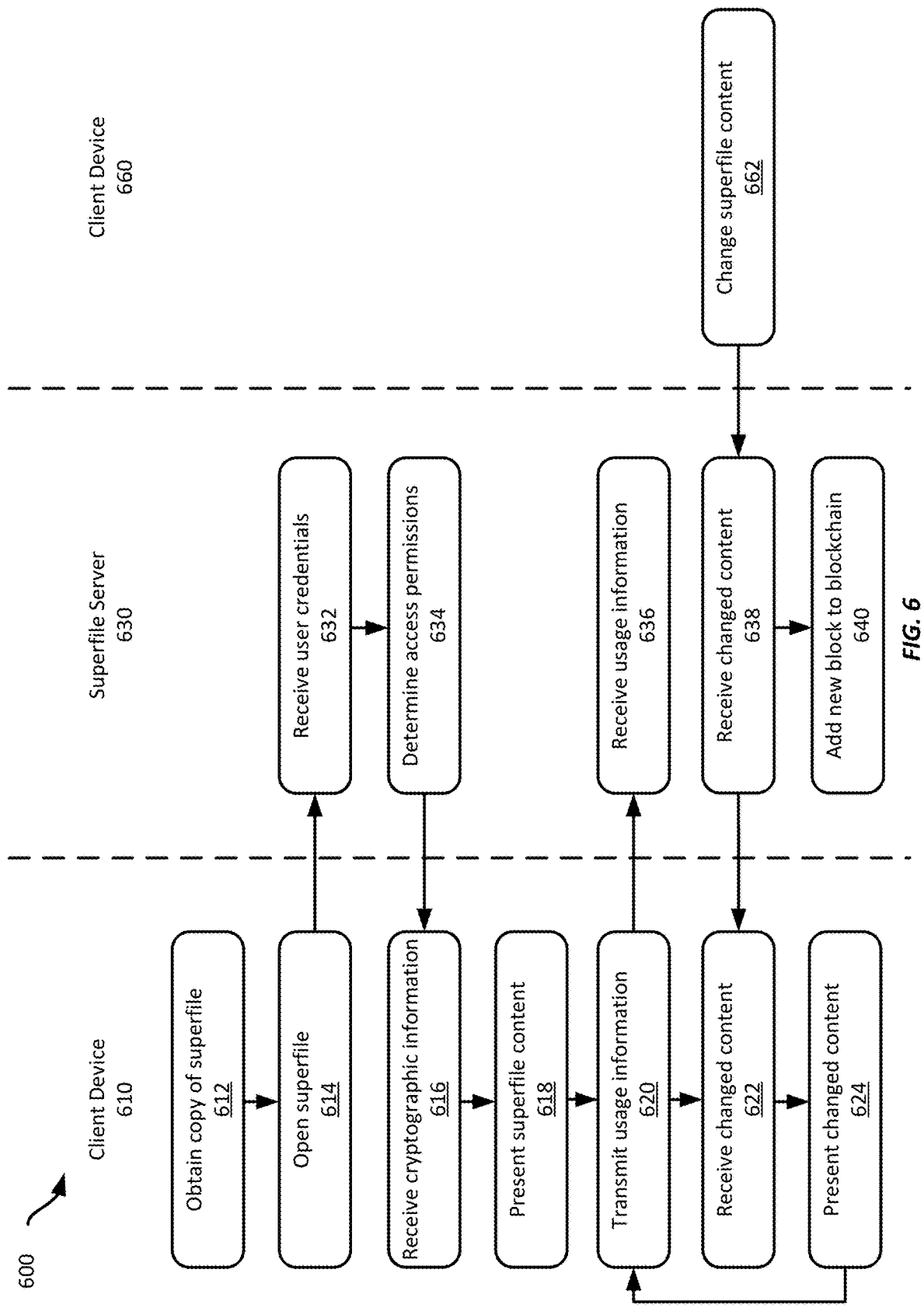

Referring now to FIG. 6, FIG. 6 shows an example method 600 for accessing, modifying, and updating a superfile. The method 600 in this example involves three different computing systems performing different aspects of the method. And while these aspects may be inter-related, each computing system performs its own distinct method, which may involve receiving inputs from another computing device or sending information to another computing device.

At block 612, a client device 610 obtains a copy of a superfile. For example, it may receive the superfile via email or by downloading it from a website. In some examples, the user may obtain the superfile using a portable storage device and connecting it to the client device 610.

At block 614, the client device 610 opens the superfile. Opening the superfile may involve accessing the contents of the superfile, though it may not involve being able to access encrypted or compressed data stored within the content payload of the superfile. A user may employ the client device 610 to open the superfile, generally as discussed above, such as with respect to items 446, 462 in FIG. 4. Further, opening the superfile may involve transmitting information to a superfile server 630 to obtain access to content stored within the superfile, such as discussed above with respect to items 446, 462.

At block 632, the superfile server 630 receives user credential information from the client device 610, which may indicate an identity of the user of the client device 610. User credential information may include user account information (e.g., a user name and password), an authenticatable token associated with a user identity established at a trusted entity, etc. In some examples, if the user credential information is not received, the superfile server 630 may respond to the client device 610 with a request for user credential information. In some examples, the superfile server 630, if it does not receive user credential information, may treat the user as an anonymous user.

At block 634, the superfile server 634 determines access permissions for the superfile for the user of the client device 610. The access permissions may be established for individual users, predefined groups of users, etc. Thus, based on the user credential information, the superfile server 630 may be able to determine whether the user has specific access permissions, such as access to view, edit, transfer ownership, etc. with respect to the superfile. Such access permissions may be maintained in a data store accessible by the superfile server 630, such as a data store discussed above with respect to block 522 of FIG. 5, or within a blockchain for the superfile.

Access permissions for different users may be applied by defining permission groups, each with particular types of allowed and forbidden actions, and assigning users to one of the groups, or by establishing custom-tailored allowed and forbidden actions on a per-user basis. Groups may be established for owners, editors, viewers, limited-time viewers, etc. Actions that may be allowed or forbidden may include transferring ownership, adding content, modifying existing content, deleting existing content, changing permission levels or revoking access for one or more users or groups, changing encryption or compression settings, viewing all content, viewing specific portions of the content, viewing ownership information, viewing creator information, etc.

After determining access permissions for the requesting user, the superfile server 630 responds to the client device 610. Depending on the response, the client device 610 may be able to access the entire content payload (or payloads) of the superfile, a portion of the content payload, fewer than all of the content payloads, etc. In this example, the superfile includes an encrypted content payload and the superfile server 630 determines that the requesting user has permission to access the contents of the superfile. In response to making that determination, the superfile server 630 obtains cryptographic information from a record corresponding to the superfile, which is stored in a data store accessible by the superfile server 630, and provides cryptographic information to the client device 610 needed to decrypt the content payload. In examples where the content payload is compressed, the superfile server 630 may also provide information indicating the type of compression applied to the content payload.

At block 616, the client device 610 receives the cryptographic information and decrypts content within the superfile. In this example, the superfile only includes one content payload, however, if the superfile includes multiple content payloads, the client device 610 may receive cryptographic information needed to decrypt some or all of the content payloads and, after receiving such cryptographic information, decrypts the content payloads for which cryptographic information was received. Similarly, if a content payload is compressed, the client device 610 also decompresses any content payloads that may be decrypted. It should be appreciated that compression may be applied before or after encryption, thus, the order of operations for compression and decryption may also be received from the superfile server or obtained from the header portion of the superfile. In this example, the client device also immediately deletes the decryption keys once the content is decrypted; however, other examples may retain copies of the decryption keys while the file is open.

At block 618, the client device 610 presents the decrypted superfile content to the user. Depending on the type of content within the superfile, the manner of presentation may vary, such as by playing audio, displaying video, presenting a document, etc.

At block 620, the client device 610 maintains a communication connection to the superfile server 630 and transmits usage information to the superfile server 630 based on usage of the content by the user. For example, the client device 610 may report which portions of the content are presented to the user, e.g., the pages of a document reviewed by the user, the tracks in a music album played by the user, the portions of a movie or television show played by the user, whether the user rewound, paused, fast-forwarded through content, how long the user had the superfile open, etc. Other information may be provided as well, such as attempted prohibited actions, including attempts to edit the document, change permissions, view ownership information, etc.

It should be appreciated that usage information may be sent over time while the superfile is open in some examples, though it may be gathered at the client device 610 and sent only when the client device 610 closes the file. Still other mechanisms for reporting usage information may be employed. And while in this example, the usage information is transmitted to the same superfile server 630 that was initially contacted to open the superfile, the usage information may be transmitted to any suitable computing device. For example the owner of the superfile may include information indicating where usage information should be sent when the superfile is created.

If communications are interrupted between the client device 610 and the superfile server 630 while the superfile is open, access to the superfile contents may be suspended immediately or after a period of time. For example, a viewer of superfile contents may lose their internet connection, at which time their client device discontinues presenting the superfile contents. It may further discard any cryptographic keys to prevent access to the superfile contents while communications with the superfile server 630 are interrupted. Once the connection is re-established, the client device 610 may present the content again, which may include re-requesting the cryptographic information from the superfile server 630 again. Revoking access may depend on a particular user's access level. For example, the owner of the superfile may never lose access to the superfile contents, while creators or editors may have a substantial timeout period, e.g., an hour, to allow them to continue revising the content without potentially losing their work. Other users, may have shorter timeout periods. For example, non-anonymous viewers of the contents may have a short timeout period, e.g., 5-10 minutes, to smooth potentially sporadic internet server. Anonymous viewers of the content may immediately lose access upon interruption. However, any suitable scheme may be used according to different examples.

At block 636, the superfile server 630 receives the usage information and stores it in a data store and associates the usage information with the superfile.

At block 662, a second client device changes content stored in a copy of the same superfile accessed by client device 610. For example, the owner of the superfile content may use client device 660 to change the contents of the superfile while client device 610 has a copy of the superfile open. The changes made by client device 660 may be of any type and may be to the content payload, the header portion, to add a new content payload, remove an existing content payload, etc.

After making the changes, the client device 660 provides the changes to the superfile server 630. The changes may be sent as updates only to a specific portion of the superfile contents or by sending the entire updated superfile to the superfile server 630. Further, the changes may be sent at any suitable time, including in real-time as the changes are made, when the user of client device 660 selects a "save file" option, or when the user of the client device 660 closes the superfile.

At block 638, the superfile server 630 receives the changes from client device 660. In this example, the superfile server 630 is the same superfile server 630 that is communicating with client device 610; however, in some examples, client device 660 may communication with a different superfile server 630 than client device 610.

After receiving the changed content, the superfile server 630 updates one or more records in a data store associated with the superfile, as needed based on the changes made by the client device 660. It then adds a new block to the blockchain corresponding to the superfile, as discussed below with respect to block 638. In addition, the superfile server 630 notifies client device 610 that the superfile has been changed. In this example, the superfile server 630 pushes the changed content to client device 610 (and any other client devices with open copies of the superfile). However, in some examples, the superfile server 630 notifies the client device 610 of the changed content and the client device 610 may transmit a request to the superfile server 630 for the changed content. For example, the client device 610 may ask the user whether to obtain the changed content or not.

In examples where multiple superfile servers are associated with a particular superfile, they each may access the same blockchain network to manage creating and adding blockchains or blocks to the blockchain network. Further, they may each have access to the same data store to obtain or update information about superfiles. Further, when one superfile server in the group of superfile servers receives an update to a superfile, it may broadcast a notification indicating that a change has been received and the other superfile servers may determine which client devices currently have a copy of the superfile open and distribute the changed content as discussed above.

At block 640, the superfile server 630 adds a new block to the blockchain corresponding to the superfile. The new block includes information indicating the changes from the prior block in the blockchain, and in some examples, a copy of the changed superfile may be stored in the new block.

At block 622, client device 610 receives the changed content from the superfile server 630 while they have the superfile open. As discussed above, the changed content may have been pushed by the superfile server 630 or it may have been requested by the client device 610, e.g., in response to the user indicating they wish to receive the changed content.

At block 624, the client device 610 presents the changed content to the user, generally as described above with respect to block 618 and continues sending usage information by returning to block 620.

Thus, this example method illustrates a way for a user to obtain a copy of a superfile and how the system will update the user's copy of the superfile in real-time while the user has the file open. Thus, the user can always be viewing the most recent version of the superfile, and the owner of the content in the superfile can ensure that copies of the superfile are always presenting the current version of the content. It should be appreciated that if the user closes the superfile before the changed content is received, the next time the superfile is opened, the superfile server 630 detects that the user has an old version of the content and provides the changed content at that time. Thus, even if a user does not have the superfile open when changes are made to it, the next time the file is opened, it will be updated generally as described above with respect to blocks 662, 636, 638, 622, and 624.

Figure 7:
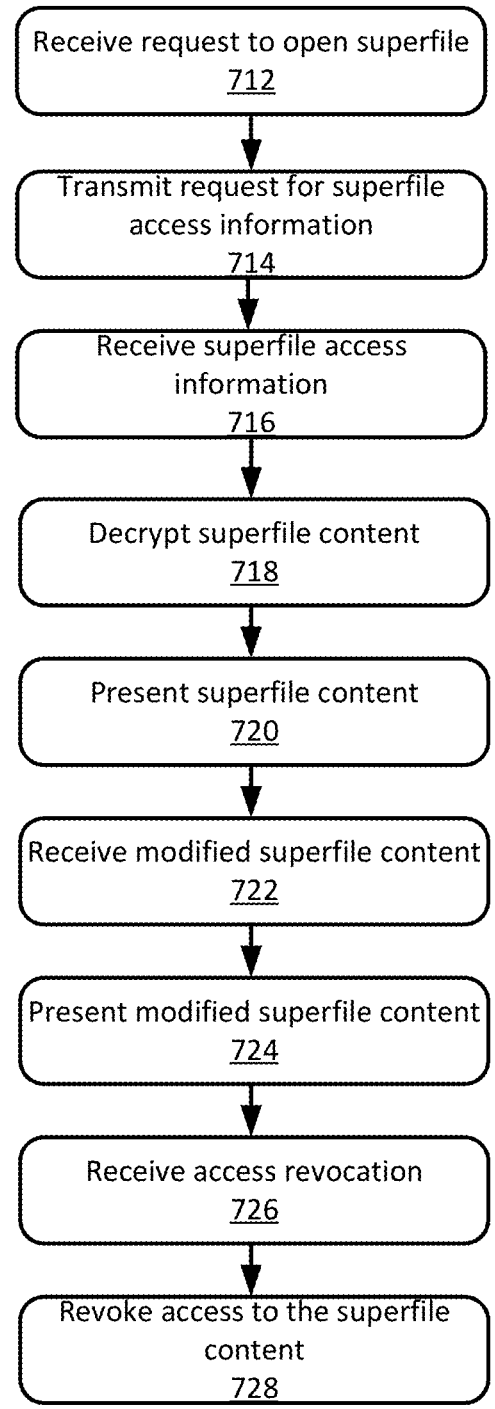

Referring now to FIG. 7, FIG. 7 illustrates an example method 700 for remote ownership and content control of media files on untrusted systems. The example shown in FIG. 7 will be discussed with respect to the example system 100 shown in FIG. 1, however, any suitable system according to this disclosure may be employed.

At block 712, a client device, e.g. client device 120a, receives a request to open a superfile, such as a user double-clicking an icon corresponding to the superfile, or selecting a superfile to open within an application.

At blocks 714 and 716, the client device 120a transmits a request to a superfile server 110 for access information for the superfile and, in response, receives access information, generally as discussed above with respect to items 446, 362 of FIG. 4 and or block 614 of FIG. 6.

At block 718, the client device 120a decrypts the superfile content using the received access information. It should be appreciated that, depending on the encryption or compression (if any) applied to the content, block 718 may be omitted or instead involve decompressing the content, or both decompressing and decrypting the content.

At block 720, the client device 120a presents the superfile content to the user, generally as described above with respect to block 618 in FIG. 6.

At block 722, the client device 120a receives modified superfile content from a superfile server, e.g., superfile server 110, generally as described above with respect to items 470, 472 of FIG. 4 or block 622 of FIG. 6, and replaces the existing superfile content with the modified superfile content.

At block 724, the client device 120a presents the modified superfile content, generally as described above with respect to FIG. 4 or block 624 of FIG. 6.

At block 726, the client device 120a receives an access revocation indication from a superfile server, generally as described above with respect to items 482, 484 of FIG. 4.

At block 728, the client device 120a revokes access to the superfile content. For example, the client device 120a may discard any cryptographic keys, such as any obtained at block 716. The client device 120a may also erase any decrypted copies of the content stored in memory, such as to present the content to the user. In some examples, the client device 120a may also delete the copy of the superfile from long-term storage, e.g., a hard disk.

It should be appreciated that the blocks of this example method were performed in a particular order, however, it should be appreciated that the blocks may be performed in a different order and some blocks may not be performed at all. For example, if no modified superfile content is received, blocks 722 and 724 may be omitted. Similarly, if no access revocation message is received, blocks 726 and 728 may be omitted. In addition, blocks 722 and 724 may be repeated if the superfile is modified multiple times.

Figure 8:
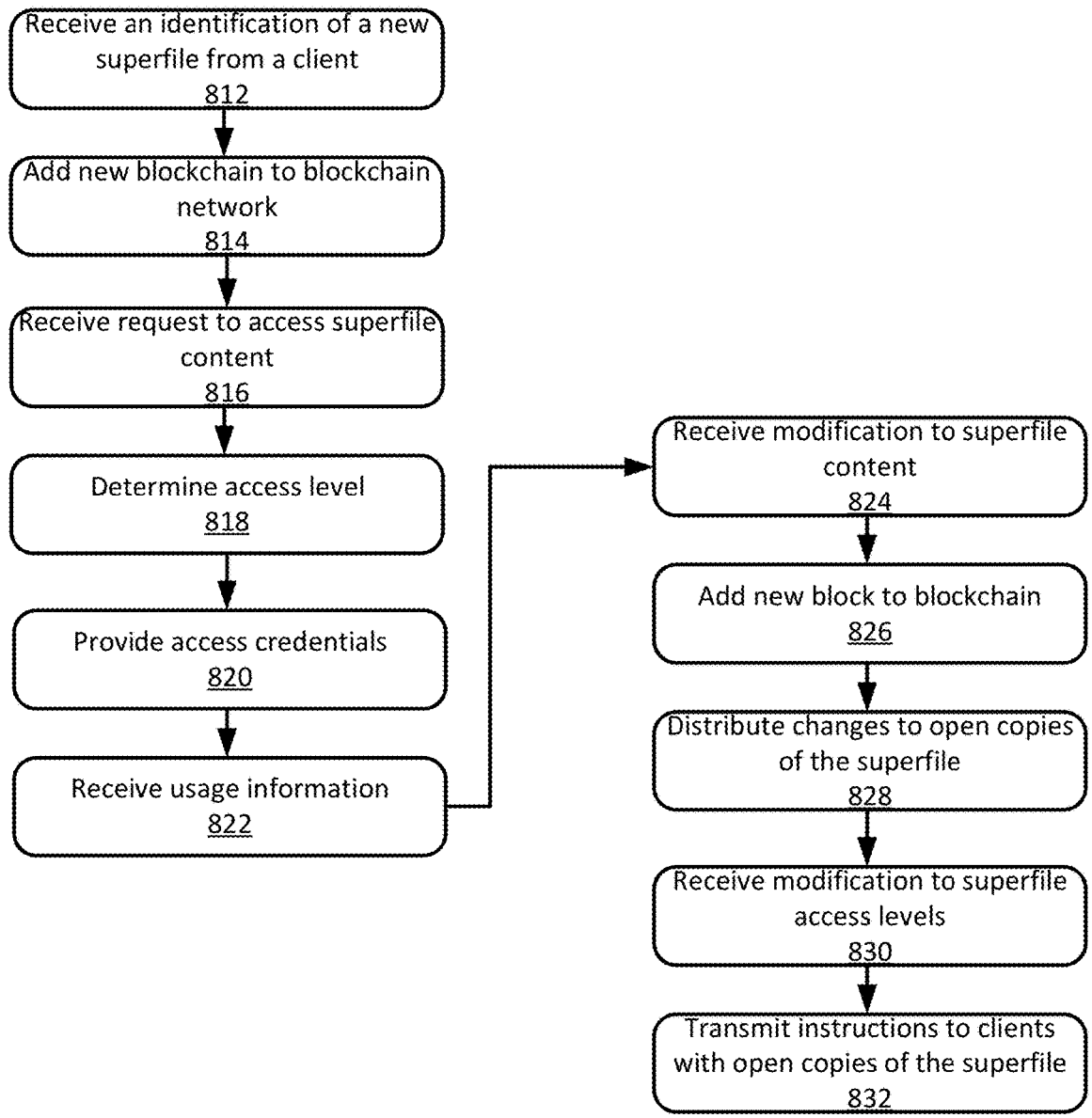

Referring now to FIG. 8, FIG. 8 shows an example method 800 for remote ownership and content control of media files on untrusted systems. The example shown in FIG. 7 will be discussed with respect to the example system 100 shown in FIG. 1, however, any suitable system according to this disclosure may be employed.

At block 812, a superfile server 110 receives an identification of a new superfile from a client device, e.g., client device 120a, generally as discussed above with respect to item 440 of FIG. 4 or blocks 514 and 522 of FIG. 5.

At block 814, the superfile server 110 adds a new blockchain to a blockchain network, e.g., blockchain network 330, generally as described above with respect to item 442 of FIG. 4 or block 524 of FIG. 5.

Ay block 816, the superfile server 110 receives a request to access superfile content from a client device, generally as described above with respect to items 446, 462 of FIG. 4 or block 614 of FIG. 6.

At blocks 818 and 820, the superfile server 110 determines an access level for the superfile and provides access information, generally as discussed above with respect to items 448, 464 of FIG. 4 or blocks 632, 634 of FIG. 6.

At block 822, the superfile server 110 receives usage information from the client device, generally as described above with respect to item 450 of FIG. 4 or block 636 of FIG. 6.

At block 824, the superfile server 110 receives a modification to the superfile's content from a client device, generally as described above with respect to item 466 of FIG. 4 or block 638 of FIG. 6.

At block 826, the superfile server 110 adds a new block to the blockchain associated with the superfile, generally as described above with respect to item 468 of FIG. 4 or block 640 of FIG. 6.

At block 828, the superfile server 110 distributes the changes to the superfile to client devices having open copies of the superfile, generally as described above with respect to items 470, 472 of FIG. 4 or blocks 622, 638 of FIG. 6.

At block 830, the superfile server 110 receives a modification to access levels for the superfile. For example, the owner of the superfile may modify access levels for different groups of users or individual users. The superfile server 110 may receive those changes and update a corresponding record into the data store 112 or it may add a new block to the blockchain corresponding to the superfile to reflect the updated permissions.

At block 832, the superfile server 110 transmits instructions to clients with open copies of the superfile. For example, if the modification to access levels revokes access to one or more users, the superfile server 110 transmits an instruction to any client device with an open superfile for one of the identified users to revoke access to the superfile, such as described above with respect to items 482, 484 of FIG. 8 or blocks 726, 728 of FIG. 7. If the modification to access levels reduces an access level, e.g., from an editor to a viewer, the superfile server 110 may transmit a corresponding instruction, which may cause the corresponding client to prevent the user from making or saving further modifications to the superfile content. In addition, the client device may present a notification to the user of the change in access level. Similarly, if the modification to access levels increases a user's access level, e.g., from viewer to editor, the client device may present a notification to the user of the change in access level and enable options in a corresponding application to allow editing and saving changes to the superfile content.

It should be appreciated that the blocks of this example method were performed in a particular order, however, it should be appreciated that the blocks may be performed in a different order and some blocks may not be performed at all. For example, if no modified superfile content is received, blocks 824-828 may be omitted. Similarly, if no access changes to any access levels are received, blocks 830 and 832 may be omitted. In addition, one or more of blocks 822-832 may be repeated based on actions taken by various client devices.

Figure 9:
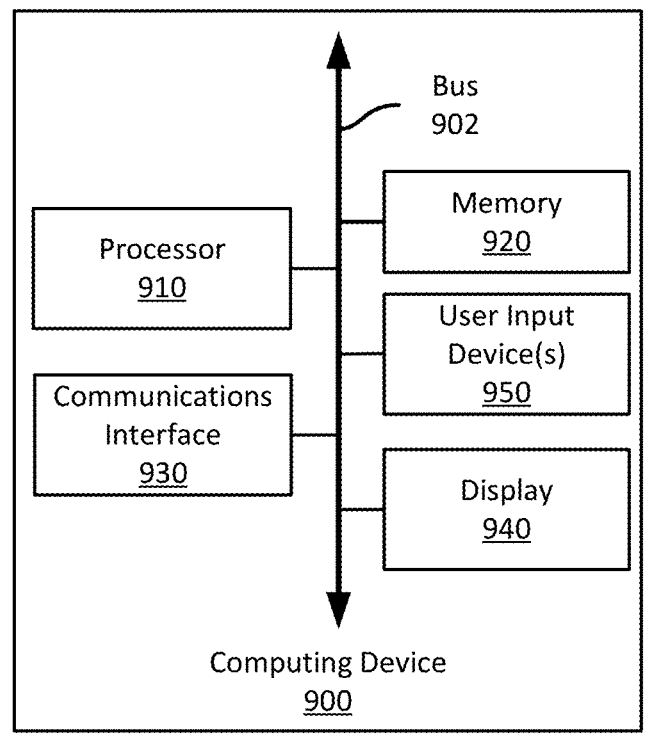
FIG. 9 shows an example computing device suitable for use with example systems and methods for remote ownership and content control of media files on untrusted systems.

Referring now to FIG. 9, FIG. 9 shows an example computing device 900 suitable for use in example systems or methods for remote ownership and content control of media files on untrusted systems according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for mediating participant interactions during a video webinar meeting according to different examples, such as part or all of the example methods 500-800 described above with respect to FIG. 5-8. The computing device 900, in this example, also includes one or more user input devices 950, such as a keyboard, mouse, touchscreen, microphone, etc., to accept user input. The computing device 900 also includes a display 940 to provide visual output to a user.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, from a remote client device, a request to access encrypted content within a first copy of a superfile, the request comprising user credential information, the first copy of the superfile stored in a memory device of the remote client device and comprising encrypted content and unencrypted information usable to identify a remote location to request a cryptographic key to access to the encrypted content;
determining a level of authorization to access the encrypted content;
in response to determining the level of authorization, providing cryptographic information to the remote client device;
while the first copy of the superfile is open at the remote client device, receiving and storing usage information from the remote client device associated with the encrypted content;
receiving modified content associated with the first copy of the superfile;
determining a second remote client device having a second copy of the superfile; and
sending updated superfile information to the second remote client device, the updated superfile information including the modified content.

2. The method of claim 1, wherein the usage information indicates a portion of content in the first copy of the superfile being presented or a user input associated with the encrypted content in the first copy of the superfile being presented.

3. The method of claim 1, wherein the level of authorization comprises at least one of an owner of the encrypted content or an authorized viewer of the encrypted content.

4. The method of claim 1, further comprising:
generating a block record for a blockchain corresponding to the superfile based on the modified content; and
adding the block record to the blockchain.

5. The method of claim 1, further comprising:
receiving, from a third remote client device, a request to access encrypted content within a copy of the superfile, the request comprising second user credential information, the copy of the superfile stored in a second memory device of the third remote client device and comprising the encrypted content;
determining a level of authorization to access the encrypted content;
in response to determining the level of authorization:
providing updated superfile information to the third remote client device, the updated superfile information including the modified content;
providing cryptographic information to the third remote client device; and
while the superfile is open at the third remote client device, receiving and storing usage information from the third remote client device associated with the modified content.

6. The method of claim 1, further comprising:
receiving a modification to one or more access levels for the superfile; and
transmitting instructions to one or more clients having open copies of the superfile based on the modification to the one or more access levels for the superfile.

7. A system comprising:
a communications interface;
a non-transitory computer-readable medium;
one or more processors communicatively coupled to the communications interface and the non-transitory computer-readable medium, the one or more processors configured to execute processor-executable instructions stored in the non-transitory computer-readable medium to:
receive, from a remote client device, a request to access encrypted content within a first copy of a superfile, the request comprising user credential information, the first copy of the superfile stored in a memory device of the remote client device and comprising encrypted content and unencrypted information usable to identify a remote location to request a cryptographic key to access to the encrypted content;
determine a level of authorization to access the encrypted content;
in response to determining the level of authorization, provide cryptographic information to the remote client device;
while the first copy of the superfile is open at the remote client device, receiving and storing usage information from the remote client device associated with the encrypted content;
receive modified content associated with the first copy of the superfile;
determine a second remote client device having a second copy of the superfile; and
send updated superfile information to the second remote client device, the updated superfile information including the modified content.

8. The system of claim 7, wherein the usage information indicates a portion of the encrypted content in the first copy of the superfile being presented or a user input associated with the encrypted content in the first copy of the superfile being presented.

9. The system of claim 7, wherein the level of authorization comprises at least one of an owner of the encrypted content or an authorized viewer of the encrypted content.

10. The system of claim 7, wherein the one or more processors are configured to execute further processor-executable instructions configured to cause the one or more processors to:
generate a block record for a blockchain corresponding to the superfile based on the modified content; and
add the block record to the blockchain.

11. The system of claim 7, wherein the one or more processors are configured to execute further processor-executable instructions configured to cause the one or more processors to:
receive, from a third remote client device, a request to access encrypted content within a copy of the superfile, the request comprising second user credential information, the copy of the superfile stored in a second memory device of the third remote client device and comprising the encrypted content;
determine a level of authorization to access the encrypted content;
in response to determining the level of authorization:
provide updated superfile information to the third remote client device, the updated superfile information including the modified content;
provide cryptographic information to the third remote client device; and
while the superfile is open at the third remote client device, receive and store usage information from the third remote client device associated with the modified content.

12. The system of claim 7, wherein the one or more processors are configured to execute further processor-executable instructions configured to cause the one or more processors to:
receive a modification to one or more access levels for the superfile; and
transmit instructions to one or more clients having open copies of the superfile based on the modification to the one or more access levels for the superfile.

13. A non-transitory computer-readable medium comprising processor-executable instructions configured to cause one or more processors to:
receive, from a remote client device, a request to access encrypted content within a first copy of a superfile, the request comprising user credential information, the first copy of the superfile stored in a memory device of the remote client device and comprising encrypted content and unencrypted information usable to identify a remote location to request a cryptographic key to access to the encrypted content;
determine a level of authorization to access the encrypted content;
in response to determining the level of authorization, provide cryptographic information to the remote client device;
while the first copy of the superfile is open at the remote client device, receive and store usage information from the remote client device associated with the encrypted content;
receive modified content associated with the first copy of the superfile;
determine a second remote client device having a second copy of the superfile; and
send updated superfile information to the second remote client device, the updated superfile information including the modified content.

14. The non-transitory computer-readable medium of claim 13, wherein the usage information indicates a portion of the encrypted content in the first copy of the superfile being presented or a user input associated with the encrypted content in the first copy of the superfile being presented.

15. The non-transitory computer-readable medium of claim 13, further comprising processor-executable instructions configured to cause the one or more processors to:
generate a block record for a blockchain corresponding to the superfile based on the modified content; and
add the block record to the blockchain.

16. The non-transitory computer-readable medium of claim 13, further comprising processor-executable instructions configured to cause the one or more processors to:
receive, from a third remote client device, a request to access encrypted content within a copy of the superfile, the request comprising second user credential information, the copy of the superfile stored in a second memory device of the third remote client device and comprising the encrypted content;
determine a level of authorization to access the encrypted content;
in response to determining the level of authorization:
provide updated superfile information to the third remote client device, the updated superfile information including the modified content;
provide cryptographic information to the third remote client device; and
while the superfile is open at the third remote client device, receive and store usage information from the third remote client device associated with the modified content.

17. The non-transitory computer-readable medium of claim 13, further comprising processor-executable instructions configured to cause the one or more processors to:
receive a modification to one or more access levels for the superfile; and
transmit instructions to one or more clients having open copies of the superfile based on the modification to the one or more access levels for the superfile.

\* \* \* \* \*